United States Patent [19]

Liston

[11] Patent Number: 4,499,963

[45] Date of Patent: Feb. 19, 1985

[54] ADJUSTMENT MEANS FOR OPERATOR CONTROLS

[75] Inventor: Allen L. Liston, Cedar Rapids, Iowa

[73] Assignee: FMC Corporation, Chicago, Ill.

[21] Appl. No.: 628,133

[22] Filed: Jul. 11, 1984

Related U.S. Application Data

[63] Continuation of Ser. No. 342,300, Jan. 25, 1982, abandoned.

[51] Int. Cl.[3] .............................................. B62D 25/20

[52] U.S. Cl. .................................... 180/90.6; 74/512; 180/334

[58] Field of Search ...................... 180/90.6, 326, 334, 180/329; 74/512, 513, 474, 478

[56] References Cited

U.S. PATENT DOCUMENTS 1,929,409 10/1933 Carr .................................. 180/334

2,620,042 12/1952 Vincent .............................. 180/334

3,223,193 12/1965 Reynolds et al. .................. 180/329

3,288,239 11/1966 Ristau ............................... 180/90.6

FOREIGN PATENT DOCUMENTS 2644626 4/1977 Fed. Rep. of Germany ...... 180/334

*Primary Examiner*—Joseph F. Peters, Jr.
*Assistant Examiner*—Ross Weaver
*Attorney, Agent, or Firm*—Ronald C. Kamp; Richard B. Megley

[57] ABSTRACT

An improved adjustment means for Operator controls in a crane having a sub-floor having a plurality of fore and aft slots with both extending therethrough to engage the floor and support the sub-floor. A pair of inner pedals are mounted on the sub-floor and operate valves carried by the sub-floor. A pair of outer pedals are also mounted on the floor and are connected by bowden cables to a control shaft mounted on the floor.

3 Claims, 6 Drawing Figures

FIG_5
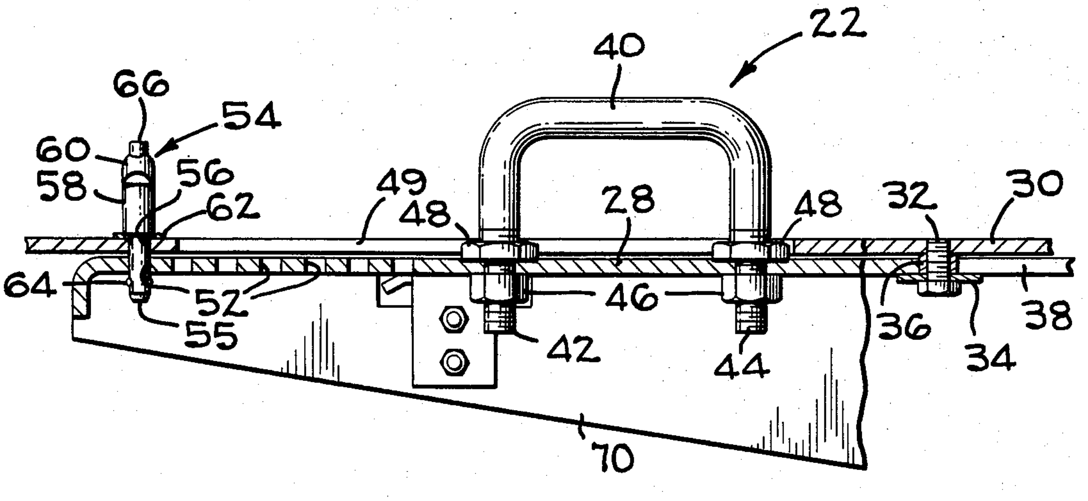
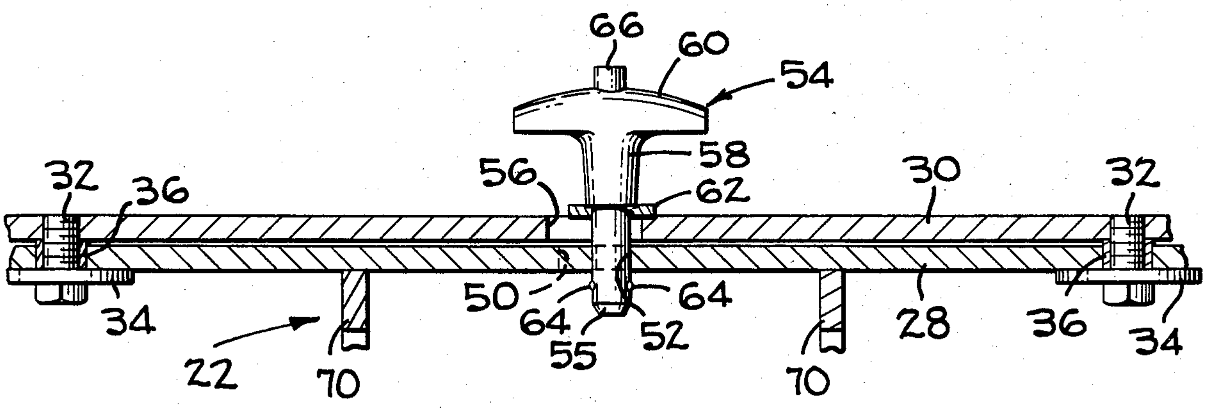
FIG_6

ADJUSTMENT MEANS FOR OPERATOR CONTROLS

This application is a continuation of application Ser. No. 342,300, filed Jan. 25, 1982 now abandoned.

BACKGROUND AND SUMMARY OF THE INVENTION

The operation of certain types of machinery, such as cranes and excavators, for example, require the coordinated manipulation of both hand levers and foot pedals. The ease with which such manipulations can be accomplished and the comfort of the operator in performing them minimizes fatigue, particularly when the operation involves a series of repetitive manipulations, improves production efficiency, reduces stress and wear on the machinery and aides in effecting the precision needed in certain applications for such machinery. Because there are inherent variations in the physical size and stature of operators, there must be some means of relative adjustment between the seat and the controls. One approach has been to provide a fore and aft adjustment for the seat alone, which permits altering the realtionship between the seat and hand levers as well as the seat and the foot pedals. Since the seat to levers and seat to pedals relationships are interdependent, it is impossible to achieve an optimum adjustment of both relationships for every operator.

Another approach has been to provide a foot pedal mounting which is moveable with the seat in its fore and aft adjustment, thus maintaining a constant relationship, in a fore and after direction, between the seat and the pedals. The pedal—seat relationship, being fixed, represents a compromise, although the lever—seat relationship may be optimized for each operator with no diminution of that compromised relationship for the seat to pedal.

The present invention provides a means for adjusting the foot pedals in a fore and after direction completely independent of the seat fore and aft adjustment so that it is possible to optimize for each operator the relationship between the seat and the hand levers and between the seat and the pedals. The structural arrangement mounts the foot pedals as well as certain valves, for movement, provides a means for adjustment which is relatively easy to utilize, which positively retains the pedals in the selected position, which is reliable, and which is comparatively inexpensive to manufacture and easy to install and maintain.

BRIEF DESCRIPTION OF THE DRAWINGS

FIG. 5 is a cross sectional view taken on line 5—5 of FIG. 3.

FIG. 6 is a cross sectional view taken on line 6—6 of FIG. 3.

DETAILED DESCRIPTION

Figure 1:
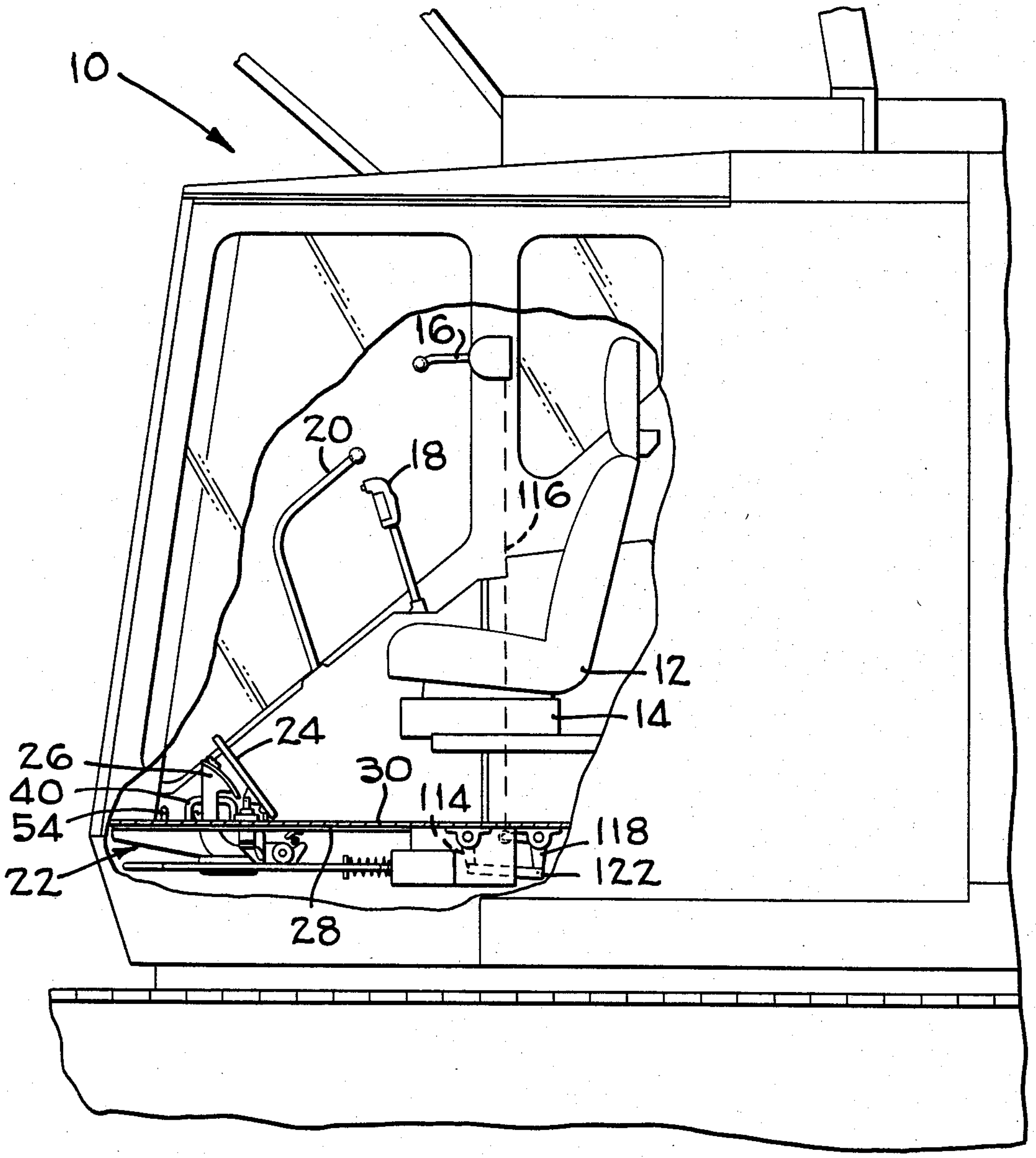
FIG. 1 is a side elevation, with portions broken away, of an operator's cab incorporating the present invention.

Referring now to FIG. 1, there is shown a cab, indicated generally at 10, having a seat 12 supported on a conventional mechanism 14 for movement of the seat in a fore and aft direction within the cab 10, i.e. to the left and to the right as viewed in FIG. 1. A plurality of hand levers, three of which are shown at 16, 18 and 20, are provided in the cab to control various functions, such as the engine governor or speed control, pressure to winch clutches, and swing speed and direction. It is apparent that by adjustment of the mechanism 14, which may also contain a vertical or height adjustment, each operator may position the seat relative to the hand levers 16, 18 and 20 for his or her maximum comfort and convenience in manipulating them. A foot pedal adjustment assembly, indicated generally in 22, permits independent adjustment of the foot pedals, two of which are shown in 24 and 26, relative to the seat 12.

The adjustment assembly 22 consists of a subfloor 28 suspended from the underside of floor 30 by a plurality of bolts 32, each of which extends through a washer 34 and a spacer 36 to engage a tapped hole in the floor 30. Each of the washers 34 is positioned between the head of the bolt 32 and the subfloor 28 and each of the spacers 36 has a thickness slightly greater than the thickness of subfloor 28 so that the bolts 32 can be tightened without binding the subfloor 28. The subfloor 28 is provided with a plurality of fore and aft extending slots 38; each slot receiving one of the spacers 36. The subfloor 28 is therefore suspended from the floor 30 while having the capability of being shifted in a fore and aft direction by means of the U shaped handle 40. The handle 40 is secured thereto by extending the threaded ends 42 and 44 thereof through holes in the subfloor and clamping them between nuts 46 and 48 engaging each of the threaded ends. A slot 49 in the floor 30 provides clearance for the handle 40 and has a lenghth sufficient to accommodate the handle 40 throughout the full range of travel for the subfloor 28.

A latch mechanism, indicated generally at 54, cooperates with the holes 50 and 52 and with a transverse slot 56 in the floor 30 to retain the subfloor 28 relative to the floor 30. The slot 56 is oriented and sized to span both rows of holes with a fore and aft width substantially equal to the holes' diameter. The latch mechanism 54 includes a locking pin 55 affixed to an enlarged stem 58 which is provided with a T shaped handle 60. A washer 62 is positioned on the pin 54, and by engaging both the floor 30 and the stem 58 limits the downward movement of the pin 54 relative to the floor 30. In order to prevent the pin 54 from being unintentionally dislodged from the selected one of the holes 50 and 52, the latch mechanism 54 may include a conventional detent arrangement. As shown in FIG. 6, a pair of detents 64 are arranged to protrude from the lower end of the locking pin 55, thereby prohibiting extraction of the pin 55 from the hole in which it has been inserted. A shaft 66 is positioned within the latch mechanism 54 and is spring biased toward the upward position shown in FIG. 6. The shaft 66 is provided with recesses capable of accepting the detents 64, when the shaft 66 is depressed, permitting the detents to move inward and thereby allow extraction and insertion of the latch mechanism. A flexible strap may connect between the floor and the latch mechanism to prevent loss of the latch.

The use of more than one row of holes in the subfloor 28 provides a smaller increment of adjustment than would be possible with a single row. The bolts 32 and the spacers 36 acting with fore-aft extending slots 38 restrain the subfloor from movement in a side to side or transverse direction, while the latch mechanism and the holes 50 and 52 restrain the subfloor from movement in a fore and aft direction.

A pair of vertical flanges 70 are affixed to the underside of the subfloor 28 and provide additional rigidity therefor. A shaft 72 extends beyond, and is supported by the flanges 70. A pair of bell cranks, one of which is shown at 74, is pivotally mounted on shaft 72; one on each end thereof. One arm of each bell crank forms the pedal 26 and a rod 76 is pivotally attached by a pin 78 to the other arm of each bell crank. The other end of each rod 76 is attached by pin 80 to spool 82 of a pair of master cylinders or brake valves 84; each valve being mounted on the adjacent flange 70. The brake pedals 26 and the valves 84, and the interconnecting linkage, move as a unit with the subfloor 28. Since the pedals 26 move relative to the floor 30, slots 86 are provided in the floor 30 to accommodate this movement. Flexible hoses, (not shown) are utilized to connect each brake valve with the remaining portion of the brake circuit carried on the crane; each brake pedal 26 is commonly utilized to control the braking of one of the drums on a wire rope crane, for example.

The outboard pedals 24, which customarily are used to control engine speed, for example, by means of setting the governor on a diesel engine, are each pivotally supported by pin 87 on a bracket 88 secured to the subfloor 20. A plunger 90 is attached to the underside of each pedal 24 by pin 92 and engages a lever 94 which is pivotally attached by pin 96 to a bracket 98 secured to the other side of the subfloor 28. A bowden cable, indicated generally at 100, has its casing or sheath 102 affixed to the bracket 98 and its moveable central wire 104 attached to the lever 94 by pin 106. The flexible bowden cable accommodates the movement of the pedals 24, along with the subfloor 28 relative to the fixed engine. Slots, not shown, must be provided in the floor 30 to permit the pedals 24 and their mounting to the subfloor to move fore and aft. These slots may be similar to slots 86 provided for pedals 26, although much wider to accommodate the mounting for the pedal 24 and the plunger 90. Alternatively, the slots for pedals 26, the slots 86 and the slot 49 may be incorporated to one large horseshoe or U-shaped opening in the floor 30.

Figures 2, 3, 4:
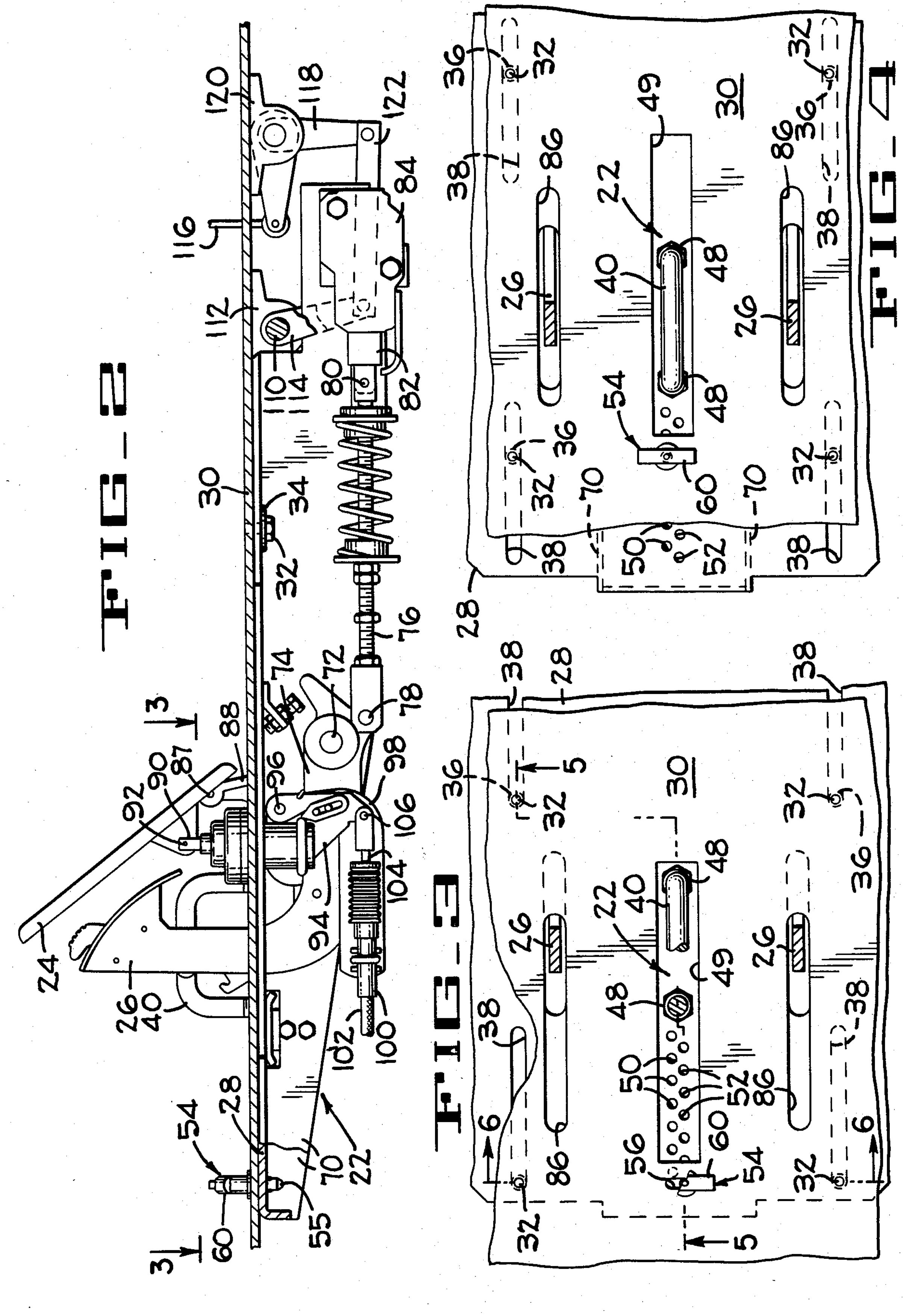
FIG. 2 is a detailed side elevation of the pedal adjustment shown in FIG. 1.
FIG. 3 is a cross sectional view taken on line 3—3 of FIG. 2, with parts broken away.
FIG. 4 is a view similar to FIG. 3, but showing the foot pedals adjusted to a different position.

It is usually desirable for both of the pedals 24 to control the speed of one engine. It is also desirable to provide a hand lever, eg. lever 16, to also control the engine speed. As shown in FIG. 2, this can be accomplished by pivotally mounting a shaft 110 on brackets 112 affixed to the underside of the floor 30. Right and left levers, the left one of which is shown in 114, are attached to the shaft. The bowden cable of the right one of pedals 24 is connected to the left lever 114 and the bowden cable from the left pedal 24 connects with the right lever. Depressing either of pedals 24 will cause the shaft 110 to rotate clockwise, as viewed in FIG. 2. An output from the angular position of the shaft 110 to the engine governor will correlate depression of either pedal 24 with the engine speed. A hand control is also provided by connecting a bowden wire 116 between the hand lever 16 and one arm of a bell crank 118 attached to the underside of floor 30 by suitable brackets 120. The link 122 is pivotally connected to each of the lever 114 and the other of the arms on the bell crank 118. The bell crank 118, the link 122 and the lever 114 transfer the position of the hand control lever 16 to an angular position for shaft 110. Thus the same connection as discussed previously between this shaft and the engine may be utilized to control engine speed.

While one embodiment of the present invention has been shown and described herein, it will be appreciated that various changes and modifications may be made therein without departing from the spirit of the invention as defined by the scope of appendant claims.

I claim:

1. In a crane having an engine, an operators cab with a floor, an engine control shaft, the angular position of which controls the engine's output, rotatably mounted on the underneath side of said floor, and a seat mounted on said floor for fore and aft movement, the improvement comprising:

- a subfloor suspended below said floor for fore and aft movement relative thereto;
- a pair of outboard pedals pivotally mounted on said subfloor for independent control of said engine;
- a pair of levers affixed to each end of said engine control shaft;
- a pair of flexible control cables, each of which is operatively connected to one of said outboard pedals and to one of said levers;
- a pair of inboard brake pedals pivotally mounted on said subfloor;
- a pair of independent master brake cylinders, each having a moveable spool, attached to said subfloor;
- a pair of rods, each of which is operatively connected between one of said inboard brake pedals and the spool of one of said brake cylinders;
- and means for selectively positioning said subfloor relative to said floor.

2. The invention according to claim 1 and further comprising:

- a bell crank pivotally mounted on the underside of said floor;
- a link pivotally connected between said bell crank and one of said levers;
- an engine control handle mounted in said cab; and
- a third flexible control cable operatively connected to said handle and said bell crank.

3. The invention according to claim 2, wherein said means for selectively positioning said subfloor relative to said floor comprises:

- a handle secured to said subfloor between said inboard pedals to facilitate fore and aft movement thereof;
- a plurality of holes of uniform diameter arranged in two parallel rows extending in a fore and aft direction in said subfloor, the holes in one row being positioned midway the holes in the other row;
- a transverse slot in said floor spanning said rows and having a width in the fore and aft direction substantially equal to the diameter of said holes; and
- a latching mechanism capable of selectively engaging one of said holes through said transverse slot to lock said subfloor relative to said floor.

* * * * *